United States Patent
Oroskar et al.

(10) Patent No.: US 10,757,741 B1
(45) Date of Patent: Aug. 25, 2020

(54) DYNAMIC RECONFIGURATION OF CARRIER PRIORITIZATION TO FACILITATE TDD-FDD CARRIER AGGREGATION SERVICE

(71) Applicant: Sprint Spectrum L.P., Overland Park, KS (US)

(72) Inventors: Siddharth S. Oroskar, Overland Park, KS (US); Mark Wade, Trimble, MO (US); Sirisha Potlabathini, Chantilly, VA (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/299,044

(22) Filed: Mar. 11, 2019

(51) Int. Cl.
| | |
|---|---|
| *H04W 76/00* | (2018.01) |
| *H04W 24/00* | (2009.01) |
| *H04L 5/00* | (2006.01) |
| *H04W 36/04* | (2009.01) |

(52) U.S. Cl.
CPC ............. *H04W 76/00* (2013.01); *H04L 5/001* (2013.01); *H04W 24/00* (2013.01); *H04W 36/04* (2013.01)

(58) Field of Classification Search
CPC ...... H04L 5/001; H04W 24/00; H04W 36/04; H04W 76/00
See application file for complete search history.

(56) References Cited

U.S. PATENT DOCUMENTS

| | | | | |
|---|---|---|---|---|
| 8,971,892 | B2 * | 3/2015 | Hole | H04W 36/0072 455/437 |
| 2013/0016690 | A1 * | 1/2013 | Jeong | H04W 24/10 370/329 |
| 2013/0109372 | A1 * | 5/2013 | Ekici | H04W 24/10 455/422.1 |
| 2015/0173094 | A1 * | 6/2015 | Vangala | H04W 72/10 370/329 |
| 2015/0181483 | A1 * | 6/2015 | Tabet | H04W 48/18 370/252 |
| 2015/0327269 | A1 * | 11/2015 | Kim | H04W 88/08 370/329 |
| 2016/0128054 | A1 * | 5/2016 | Noh | H04L 5/14 370/280 |
| 2018/0220365 | A1 * | 8/2018 | Fang | H04W 48/17 |

* cited by examiner

*Primary Examiner* — Kevin C. Harper (57) ABSTRACT

A base station that provides coverage on at least one TDD carrier and at least one FDD carrier detects that the base station is serving a UE on just one or more of the TDD carrier(s) and that the UE is TDD-FDD CA capable. In response, the base station reconfigures the UE to change the UE's carrier prioritization from (i) prioritizing TDD over FDD to (ii) prioritizing FDD over TDD. For instance, if TDD carriers are defined in one or more frequency bands, and FDD carriers are defined in one or more other frequency bands, this could involve changing the UE's band prioritization to cause the UE to prefer connecting on TDD.

20 Claims, 4 Drawing Sheets

DYNAMIC RECONFIGURATION OF CARRIER PRIORITIZATION TO FACILITATE TDD-FDD CARRIER AGGREGATION SERVICE

BACKGROUND

A wireless communication system typically includes a number of base stations that are configured to provide wireless coverage areas in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on one or more carriers each defining one or more ranges of frequency spectrum and having a respective downlink channel for carrying communications from the base station to UEs and a respective uplink channel for carrying communications from the UEs to the base station. Such carriers could be frequency division duplex (FDD), in which the downlink and uplink channels are defined as separate respective ranges of frequency (each having a respective frequency bandwidth and center frequency), or time division duplex (TDD), in which the downlink and uplink channels are defined on a common range of frequency (having a particular bandwidth and center frequency) but are distinguished from each other through time division multiplexing, with certain time intervals being used for downlink communication and other time intervals being used for uplink communication. Further, the downlink channel and uplink channel of each carrier could also be divided into respective sub-channels for carrying particular communications, such as one or more control channels for carrying control signaling and one or more traffic channels for carrying application-layer data and other traffic.

In an example system, for instance, the air interface could be divided over time into frames and subframes each defining a number of slots, and the uplink and downlink channels could each be divided over their frequency bandwidth into subcarriers that are grouped within each slot into physical resource blocks (PRBs) for carrying bearer traffic, and with portions of each subframe further defining various control channels for signaling communication between the base station and UEs.

OVERVIEW

When a UE is positioned within coverage of a base station, the UE could connect with the base station on a particular carrier on which the base station is configured to provide service, and the base station could then schedule particular downlink and uplink PRBs on that carrier to carry data communications to and from the UE. Further, the base station and UE could modulate their air interface data communications at a coding rate selected based on quality of the UE's coverage, such as with higher rate coding rate when the UE is in better coverage of the base station and with a lower coding rate when the UE is in worse coverage of the base station.

In the example system noted above, for instance, when the base station has data to transmit to a UE, the base station could assign certain downlink PRBs (and thus certain subcarriers) in a given subframe for use to carry the data to the UE at a particular modulation and coding scheme (MCS) selected based on the UE's coverage quality, and the base station could then (i) transmit to the UE in that subframe a DCI message that specifies the assigned PRBs and MCS and (ii) encode and transmit the data to the UE in the assigned PRBs in that subframe. Per the DCI message, the UE could then read the transmitted data from the assigned PRBs.

Likewise, when the UE has data to transmit to the base station and transmits a scheduling request to the base station, the base station could responsively assign certain uplink PRBs in a given subframe for use to carry the data from the UE using a particular MCS selected based on the UE's coverage quality and could transmit to the UE, in advance of that subframe, a DCI message that specifies the assigned PRBs and MCS. And the UE could then encode and transmit the data to the base station in the assigned PRBs.

In practice, a base station could serve a UE on a single carrier, such as the carrier on which the UE connects with the base station, in which case the base station could allocate PRBs on that carrier for use to carry communications to and from the UE.

Alternatively, the base station could serve the UE on multiple carriers at once, providing "carrier-aggregation" service. With carrier-aggregation service, when faced with a need to schedule data communication to or from the UE in a given subframe, the base station could then distribute the data communication concurrently among the multiple carriers, allocating PRBs on each carrier respectively to carry some of the data. Serving the UE concurrently on multiple carriers could facilitate increased peak data rates and may provide other provide benefits as well.

A typical implementation of carrier aggregation designates the carrier on which the UE initially connects with the base station as a primary component carrier (PCC) carrier and designates each other carrier on which the base station concurrently serves the UE as a secondary component carrier (SCC). Thus, the UE could initially connect with and be served by the base station on a given carrier, and the base station could then invoke carrier-aggregation service for the UE by designating that carrier as the UE's PCC and adding to the UE's connection one or more additional carriers as SCCs.

A practical distinction between the PCC and each SCC is that the PCC functions as an anchor carrier for certain control signaling between the base station and the UE regarding the service on both the PCC and each SCC. For instance, the base station and UE may use the PCC rather than the SCC(s) for scheduling-request and DCI signaling. In particular, when the base station will transmit data to the UE on the PCC and one or more SCCs, the base station may transmit a DCI message to the UE on just the PCC, designating the PRBs respectively on each component carrier, and the UE would be configured to monitor for receipt of such a DCI message on the PCC rather than on the SCC(s). Likewise, when the UE seeks has data to transmit to the base station, the UE may transmit to a scheduling request to the base station on just the PCC, and the base station would be configured to monitor or receipt of such a scheduling request from the UE on the PCC rather than on the SCC(s).

Historically, carrier aggregation provided for service of a UE on a combination of FDD carriers or a combination of TDD carriers, but not a mix of FDD and TDD carriers. Recently, however, the industry has begun to support TDD-FDD carrier aggregation (TDD-FDD CA), where a base station would serve a UE on a combination of at least one TDD carrier and at least one FDD carrier (e.g., a combination of up to two FDD carriers and up to three TDD carriers). With such a mix of carriers, the FDD carrier could support downlink and uplink communications in each subframe, but the TDD carrier may support just downlink communications in certain subframes and just uplink communications in other subframes. As the industry advances to support TDD-FDD CA, some newer UEs may be TDD-FDD CA capable, while other UEs may not be TDD-FDD CA capable.

A technical limitation with providing TDD-FDD CA service is that the UE's PCC should be an FDD carrier rather than a TDD carrier. This limitation stems from the point noted above that the PCC is typically the anchor carrier for certain control signaling between the base station and the UE. If a UE's PCC is a TDD carrier and the UE has an FDD carrier as an SCC, then it would not be feasible for the UE's PCC to carry downlink control signaling to the UE in any uplink subframe of the PCC. As a result, the base station may be unable to transmit a DCI message to the UE in any such subframe to schedule downlink transmission to the UE on the UE's FDD SCC in that subframe. Likewise, it may not be feasible for the UE's TDD PCC to carry uplink control signaling from the UE in any downlink subframe of the PCC. And as a result, the UE may be unable to transmit a scheduling-request to the base station in any such subframe to request scheduling of uplink transmission.

In certain wireless system implementations, however, UEs may be set by default to prioritize connecting on a TDD carrier when faced with the choice between whether to connect on a TDD carrier or whether to connect on an FDD carrier. This default setting could be a wireless service provider preference, designed to foster use of TDD carriers that might have wider bandwidth or other benefits. However, an unfortunate result of this implementation is that a UE that is TDD-FDD capable and could theoretically benefit from TDD-FDD CA service when in coverage of both a TDD carrier and an FDD carrier may be unable to obtain TDD-FDD CA service as noted above, because the UE's PCC would be a TDD carrier rather than an FDD carrier.

One solution to this problem is that when a base station serves such a UE on a TDD carrier and seeks to invoke TDD-FDD CA service for the UE, the base station could hand over the UE from the TDD carrier to an FDD carrier and could then add the TDD carrier as an SCC for the UE. But this solution may be undesirable, especially when a UE is connected and may be actively engaged in data communication, as handing over the UE between carriers could pose an increased risk of a dropped connection or other issues.

Disclosed herein is an improved solution.

In accordance with the disclosure, a base station that provides coverage on at least one TDD carrier and at least one FDD carrier will detect that the base station is serving a UE on just one or more of the TDD carrier(s) and that the UE is TDD-FDD CA capable. And in response to at least those two factors in combination, the base station will reconfigure the UE to change the UE's carrier prioritization from (i) prioritizing TDD over FDD to (ii) prioritizing FDD over TDD. In practice, TDD carriers may be defined in one or more frequency bands, and FDD carriers may be defined in one or more other frequency bands. Thus, the UE may be configured by default to prioritize connecting on the one or more TDD bands over connecting on the one or more FDD bands, and the present process could involve reconfiguring the UE to cause the UE to instead prioritize connecting on the one or more FDD bands over connecting on the one or more TDD bands.

In a representative implementation, the base station could so reconfigure the UE at the time UE is disconnecting from the base station so that the next time the UE connects with the base station the UE would prioritize FDD over TDD and may therefore connect on a FDD carrier to facilitate TDD-FDD CA. For instance, the base station could engage in this reconfiguration of the UE by including in a connection-release message to the UE a directive to change the UE's carrier prioritization.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, reordered, or otherwise modified. In addition, operations described as being performed by one or more entities could be implemented in various ways, such as by a processor executing instructions stored in non-transitory data storage, along with associated circuitry or other hardware, for instance.

Figure 1:
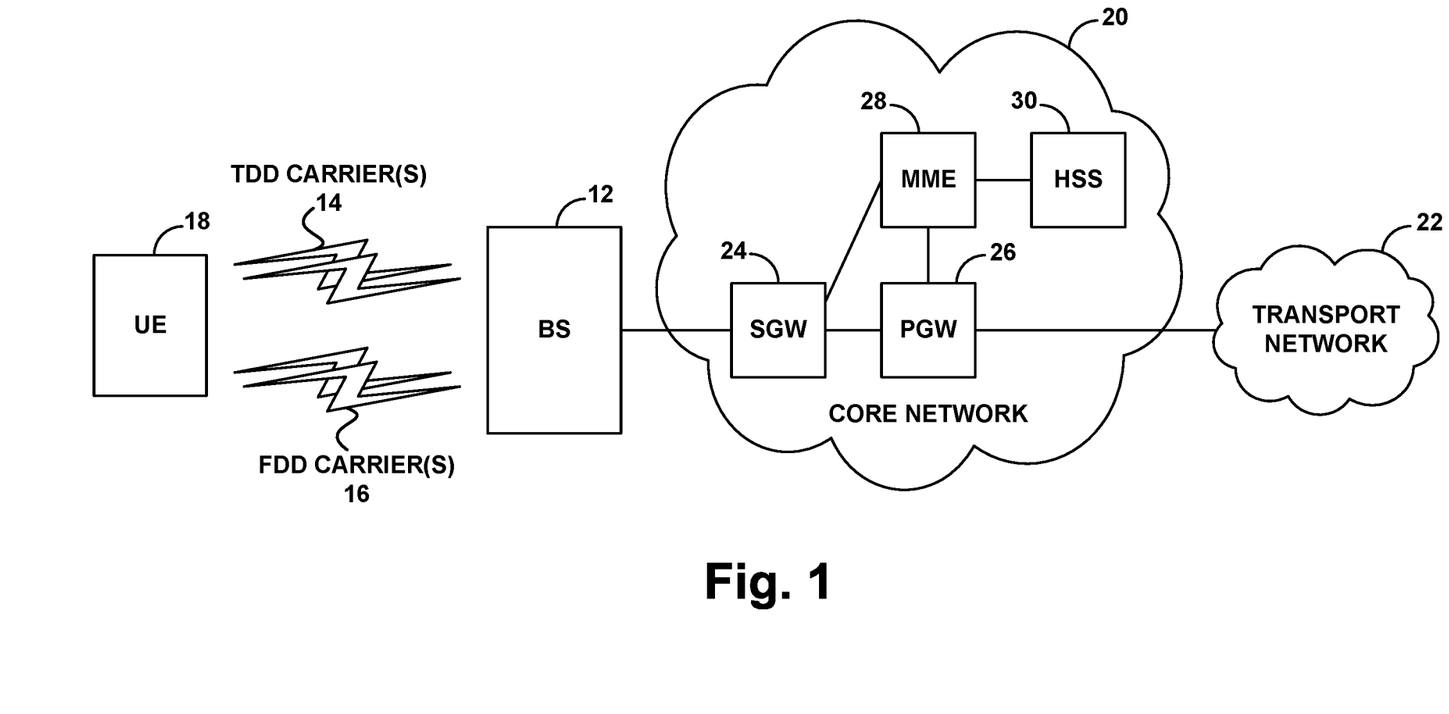
FIG. 1 is a simplified block diagram of a wireless communication system in which disclosed features can be implemented.

As shown in FIG. 1, the example wireless communication system includes a representative base station 12 configured to provide coverage on one or more TDD carriers 14 and one or more FDD carriers 16. Shown operating within coverage of the base station is then a representative UE 18, which could be of the type discussed above, among other possibilities.

The base station could be a macro base station of the type configured to provide a wide range of coverage, possibly including an antenna array mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5G NR gigabit Node-B (gNB), among other possibilities.

The base station is shown coupled with or sitting as a node on a core network 20, which could be an evolved packet core (EPC) network, next generation core (NGC) network, or another network including components supporting an applicable radio access technology and could provide connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has an interface with the SGW and the HSS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication.

As noted above, the base station's TDD carrier(s) and FDD carrier(s) could be defined in different frequency bands than each other. For instance, each TDD carrier could be defined in the 2.5 GHz frequency band (Band 41), and each FDD carrier could be defined in the 1.9 GHz frequency band (Band 25) or the 850 MHz frequency band (Band 26), among other possibilities.

Further, as discussed above, the air interface on each such carrier could be structured to define various air-interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain (on the downlink and uplink channels respectively for FDD, or on the shared downlink/uplink channel for TDD), the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. In practice, the base station's coverage could define a cell having the same physical cell identifier (PCI) on each of the carriers, and the synchronization signal on each carrier could algorithmically map to the PCI, to facilitate UE determination of the PCI upon detecting coverage on a carrier.

And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

In operation, the UE could scan for coverage by tuning to various center frequencies in search of a broadcast synchronization signal. The UE may thereby detect the base station's synchronization signal on each of various carriers, and for each such carrier, the UE may then read the base station's MIB on the carrier to determine the carrier's bandwidth and may then evaluate the carrier's reference signal to determine whether the coverage on the carrier is sufficiently strong. Faced with a choice of multiple such carriers with sufficiently strong coverage, the UE may then select a carrier on which to connect with the base station.

As noted above, the UE could be configured by default to prioritize TDD carriers (e.g., one or more TDD bands) over FDD carriers (e.g., one or more FDD bands). This configuration of the UE could take the form of an ordered list of carriers that is stored in the UE to cause the UE to scan for TDD coverage before scanning for FDD coverage, so that if the UE detects threshold strong coverage on a TDD carrier, the UE may connect with the base station on that TDD carrier without searching further. Or the configuration could take the form of a setting in the UE that causes the UE to connect on a threshold strong TDD carrier where the UE has discovered threshold strong coverage of both that TDD carrier and an FDD carrier. Other arrangements are possible as well.

To connect with the base station on a selected carrier, the UE could engage in random access signaling with the base station on the carrier, and the UE could then engage in Radio Resource Control (RRC) configuration signaling with the base station to establish an RRC connection with the base station on the carrier. Establishing this connection puts the UE into an RRC-connected mode.

Once the UE is connected with the base station, the UE could then transmit to the base station an attach request if appropriate, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE one or more corresponding radio bearers and an associated context record, and the base station could receive from the UE and/or the HSS (via the MME) a set of capabilities and profile data for the UE and could store that data in the context record for reference while serving the UE.

The base station could then serve the UE with data communications on the carrier as discussed above.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs. And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

At the time of initial UE connection or while serving the UE in the RRC-connected mode, the base station could further decide to invoke carrier-aggregation service for the UE. The base station may make this decision based on a determination that the UE is engaged in (or likely to engage in) particular communication that could benefit from increased peak data rate, and/or based on consideration of one or more other factors.

To invoke carrier-aggregation service for the UE, the base station could receive from the UE a measurement report that indicates the UE detecting threshold strong coverage from the base station on one or more additional carriers in addition to the carrier on which the base station is currently serving the UE, and the base station could responsively engage in RRC signaling with the UE to add each of one or more such carriers to the UE's RRC connection as an SCC. For instance, the base station could transmit to the UE an RRC connection reconfiguration message that designates each added carrier by unique carrier identifier and indicates (e.g., by a suitable index number) that the carrier will be an SCC for the EU. Both the base station and the UE could thus update their internal records to indicate that the UE is being served with carrier aggregation on a combination of the UE's initially serving carrier as PCC and each additional designated carrier as SCC.

Once the base station has invoked carrier-aggregation service for the UE, the base station could then serve the UE with data communications concurrently on the UE's PCC and one or more SCCs.

For instance, when data arrives at the base station for transmission to the UE, the base station could allocate one or more PRBs distributed among the carriers in a given subframe for use to transmit at least a portion of the data to the UE. And the base station could transmit to the UE in that subframe on the UE's PCC a DCI message that designates the PRBs (e.g., certain PRBs respectively per carrier), and the base station could accordingly transmit the transport block to the UE in those designated PRBs. And when the UE has data to transmit to the base station, the UE could transmit to the base station on the UE's PCC a scheduling request, the base station could responsively allocate one or more uplink PRBs distributed among the carriers in an upcoming subframe for carrying at least a portion of that data from the UE and could transmit to the UE on the UE's PCC a DCI message that designates those upcoming PRBs, and the UE could then accordingly transmit the transport block to the base station in the designated PRBs.

As noted above, the present disclosure addresses a situation where the base station is serving the UE on just one or more TDD carriers, and where the UE is capable of engaging in TDD-FDD CA service but where such service would require the UE to have an FDD carrier as PCC.

The base station might discover this situation at the time the UE initially connects with the base station on a TDD carrier (i.e., as the UE's sole serving carrier) and/or subsequently upon determining that the UE could benefit from an increased peak data rate.

In particular, the base station could detect the fact that the base station is serving the UE on just the one or more TDD carriers, based on a review of the UE's context record. Further, the base station could determine that the UE supports TDD-FDD CA service. For instance, the UE capability data that the base station received from the UE or MME might indicate that the UE supports TDD-FDD CA service (e.g., that the UE has a radio configuration that would enable the UE to engage in TDD-FDD CA communication), and so the base station could make this determination by referring to that data. Further, when serving the UE on just the one or more TDD carriers, the base station might determine that it has also received from the UE a measurement report indicating that the UE has detected threshold strong coverage of the base station, in the same cell, on an FDD carrier—which could further establish that the UE supports TDD-FDD CA.

In response to at least the base station detecting that base station is serving the UE on just the one or more TDD carriers and that the UE supports TDD-FDD CA service, as noted above, the base station could then reconfigure the UE to change the UE's carrier prioritization from (i) prioritizing TDD over FDD to (ii) prioritizing FDD over TDD. For instance, as noted above, in the scenario where TDD carriers are defined in different bands than FDD carriers, the base station could reconfigure the UE to change the UE from (i) prioritizing the TDD band(s) over the FDD band(s) to (ii) prioritizing the FDD band(s) over the TDD band(s).

As still further noted above, in a representative implementation, the base station could so reconfigure the UE at the time UE is disconnecting from the base station so that the next time the UE connects with the base station the UE would prioritize FDD over TDD and may therefore connect on an FDD carrier to facilitate TDD-FDD CA. In practice, for instance, the UE could disconnect from the base station upon expiration of a threshold inactivity period of the UE not engaging in any scheduled data communication on the UE's one or more serving TDD carriers, or upon occurrence of one or more other connection-release triggers.

The process of disconnecting the UE could involve the base station transmitting to the UE an RRC connection-release message, which would transition the UE to an RRC idle mode. Further, the base station may correspondingly delete its context record for the UE or mark the context record to indicate that the UE is in an RRC idle mode, and the UE could update its records as well. Typically in the RRC idle mode, the UE would periodically scan for page messages or the like, but the UE would not have an RRC connection on which the base station could schedule downlink or uplink data communication with the UE. If and when the UE then seeks to engage in data communication (e.g., on its own initiative or in response to a page message), the UE could then once again engage in random access signaling and RRC connection signaling to establish an RRC connection.

Accordingly, in a representative implementation of the present process, the base station could include within the RRC connection-release message that the base station sends to the UE a re-prioritization command, code, or other indication that would be interpretable by the UE to cause the UE to change UE's stored carrier prioritization (e.g., band prioritization) from (i) prioritizing TDD over FDD to (ii) prioritizing FDD over TDD. Alternatively or additionally, the base station could deliver to the UE, in the release message or otherwise, a set of revised prioritization data. For instance, if the UE stores an ordered list of carriers that lists TDD carriers with higher priority than FDD carriers, the base station might transmit to the UE a revised ordered list of carriers that instead lists FDD carriers with higher priority than TDD carriers.

From the UE's perspective, when the UE is served by the base station on just one or more TDD carriers, perhaps at the time that connection is being released, the UE could thus receive from the base station an indication that the UE's carrier prioritization should be changed from (i) prioritizing TDD over FDD to (ii) prioritizing FDD over TDD. And in response, the UE could set itself accordingly.

As noted above, the UE's default prioritization of TDD over FDD might take the form of an ordered scan-list or other setting. To implement the reprioritization, the UE could change its ordered scan-list to list FDD carriers before TDD carriers, and/or the UE could adjust its setting so that when the UE discovers threshold strong coverage of both a TDD carrier and an FDD carrier, the UE would opt to connect on the FDD carrier rather than the TDD carrier, among other possibilities.

Further, the UE could be structured with program logic or the like to selectively apply this re-prioritization.

By way of example, the UE could be structured to apply this re-prioritization only when the UE is in coverage of both TDD and FDD carriers from the same base station and particularly in the same cell, as may be indicated by the UE detecting that it is within coverage of both a TDD carrier and an FDD carrier having the same PCI as each other. For instance, when the UE scans for coverage, the UE could detect coverage of both a TDD carrier and an FDD carrier. And the UE could determine (e.g., from the detected synchronization signals) if the two carriers have the same PCI as each other or are otherwise in the same cell. If the UE determines that the two carriers are in the same cell, then, based on that determination, the UE could apply the re-prioritization and thus select the FDD carrier rather than the TDD carrier. Whereas, if the UE determines that the two carriers are not in the same cell, then, based on that determination, the UE could forgo applying the re-prioritization and could instead apply the UE's default prioritization and thus select the TDD carrier rather than the FDD carrier.

As another example, the UE could be structured to maintain the re-prioritization for only so long as the UE remains within coverage of the cell including being in coverage of at least one TDD carrier of the cell and at least one FDD carrier of the cell. For instance, if and when the UE hands over from that cell to another cell, the UE could responsively revert to the UE's default prioritization. Or if and when the UE is still within the base station's cell but is no longer within coverage of both a TDD carrier of that cell and an FDD carrier of that cell, the UE could responsively revert to the UE's default prioritization.

As yet another example, the UE could be structured to maintain the re-prioritization for a limited time period and to automatically revert to its default carrier prioritization after expiration of that time period. For instance, when the UE becomes reconfigured to prioritize FDD over TDD, the UE could set a timer for maintaining the re-prioritization. And upon expiration of that timer, the UE could responsively revert to the UE's default prioritization.

And as still another example, the UE could be structured to apply the re-prioritization only when the UE is going to engage in certain types of communication, such as communications that could benefit from higher peak data rate. For instance, while the UE is going to transition from the RRC idle mode to the RRC connected mode in order to establish an RRC connection in response to a user of the UE invoking a particular communication application, the UE could determine based on the invoked application whether to apply the re-prioritization or rather the UE's default prioritization. If the UE determines that the application is a type that would likely benefit from increased peak data rate (such as a web-browser application or a streaming-video application), then, based on that determination, the UE could apply the re-prioritization rather than its default prioritization, so as to foster connection on an FDD carrier and to thereby facilitate possibly receiving TDD-FDD CA service. Whereas, if the UE determines that the application is a type that would likely not have a need for increased peak data rate (such as a voice over Internet Protocol (VoIP) application), then, in response to that determination, the UE could apply its default prioritization rather than the re-prioritization.

Figure 2:
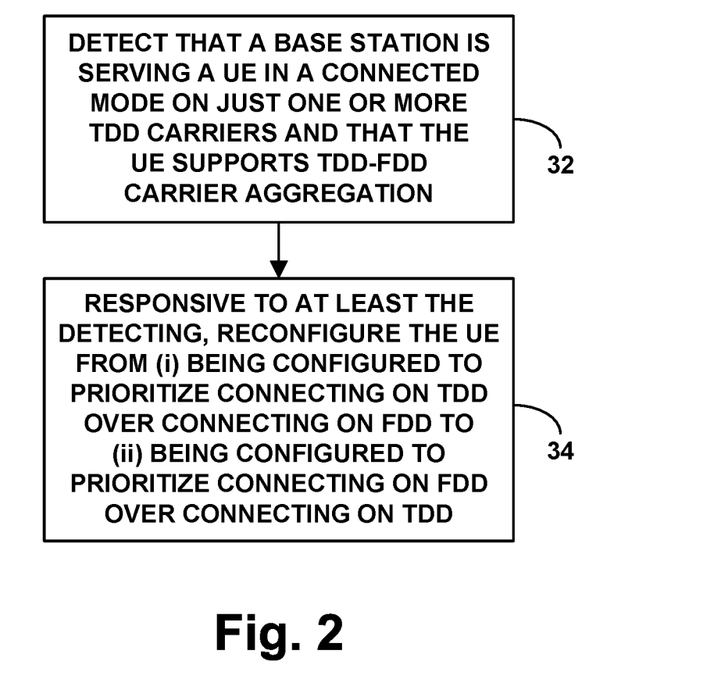
FIG. 2 is a flow chart depicting example operations in accordance with the disclosure.

FIG. 2 is a flow chart depicting a method that could be carried out in accordance with this disclosure, to configure a UE for operation in wireless communication system that includes a base station, where the base station provides a coverage area on at least one TDD carrier and on at least one FDD carrier, and where the UE is configured to prioritize connecting on TDD over connecting on FDD. As shown in FIG. 2, at block 32, the method includes the base station detecting that the base station is serving the UE in a connected mode on just one or more of the at least one TDD carrier (e.g., on just one TDD carrier, or on multiple TDD carriers with carrier-aggregation service, and not on an FDD carrier) and that the UE supports TDD-FDD carrier aggregation. And at block 34, the method includes, responsive to at least the detecting, reconfiguring the UE from (i) being configured to prioritize connecting on TDD over connecting on FDD to (ii) being configured to prioritize connecting on FDD over connecting on TDD.

In line with the discussion above, TDD carriers could be defined on one or more first bands and FDD carriers can be defined on one or more second bands, in which case the act of so reconfiguring the UE could involve reconfiguring the UE from (i) being configured to prioritize connecting on the one or more first bands over connecting on the one or more second bands to (ii) being configured to prioritize connecting on the one or more second bands over connecting on the one or more first bands.

Further as discussed above, the act of the base station detecting that the base station is serving the UE on just the one or more TDD carriers could be based on reference to a UE-context record maintained by the base station. And the act of the base station detecting that the UE supports TDD-FDD carrier aggregation could be based on reference to capability data of the UE and could be additionally based on the base station having received from the UE a measurement report indicating that the UE is also within coverage of one or more of the at least one FDD carrier.

Still further, as discussed above, the act of reconfiguring of the UE could occur during disconnection of the UE from the base station on the one or more TDD carriers. For instance, the reconfiguring of the UE could involve the base station including in a connection-release message to the UE an indication interpretable by the UE to cause the UE to change from (i) being configured to prioritize connecting on TDD over connecting on FDD to (ii) being configured to prioritize connecting on FDD over connecting on TDD.

Yet further, as discussed above, the UE could have a scan-list that causes the UE to scan for TDD coverage before scanning for FDD coverage, and the act of reconfiguring of the UE could involve the base station providing the UE with a revised scan-list that causes the UE to instead scan for FDD coverage before scanning for TDD coverage.

Figure 3:
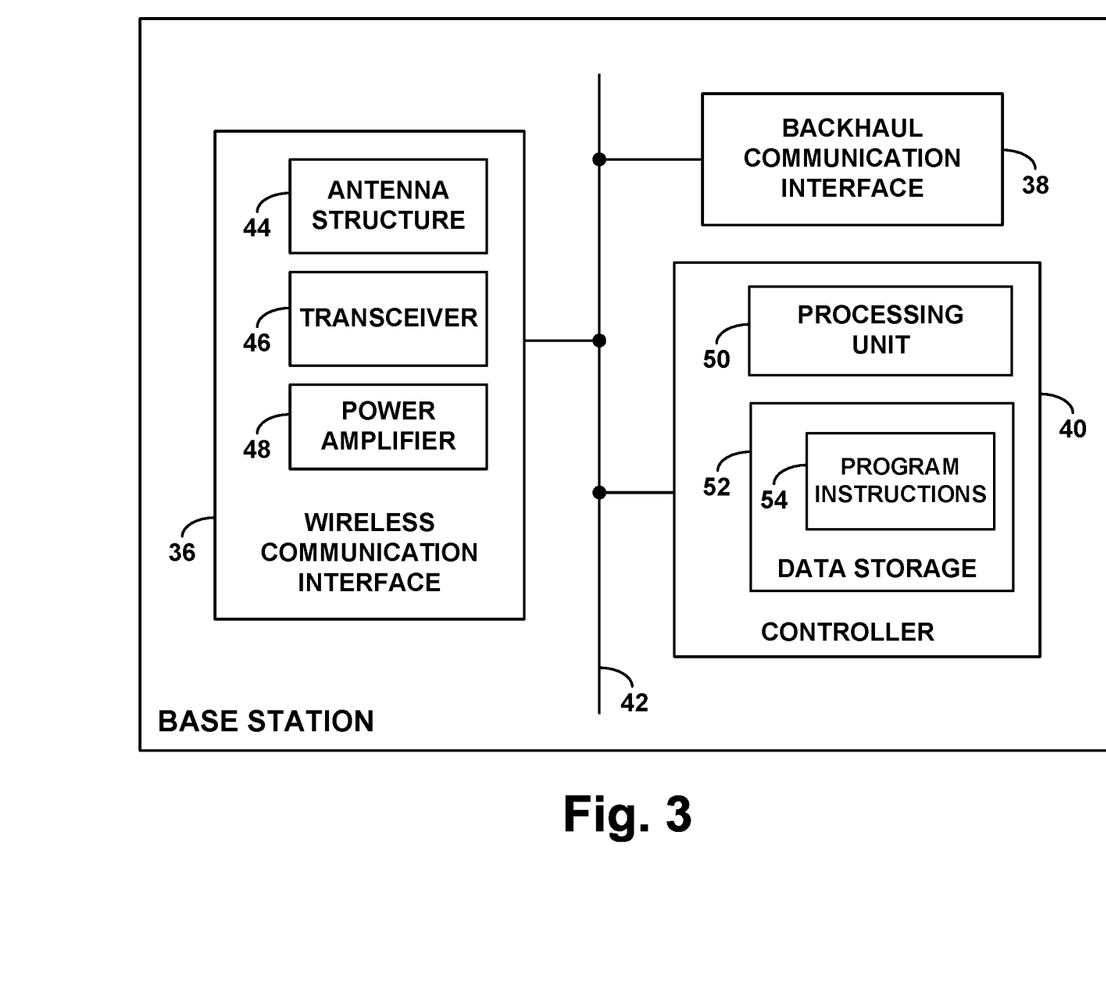
FIG. 3 is a simplified block diagram of an example base station operable in accordance with the disclosure.

FIG. 3 is a simplified block diagram of an example base station operable in line with the discussion above. As shown, the example base station includes a wireless communication interface 36, a backhaul communication interface 38, and a controller 40, which could be integrated or communicatively linked together by a system bus, network, or other connection mechanism 42 and/or could be integrated together or distributed in various ways.

The wireless communication interface 36 could include an antenna structure (e.g., a MIMO antenna array, possibly a massive-MIMO array) 44, a transceiver 46, and a power amplifier 48, among one or more other RF components, to cooperatively facilitate air interface communication with a UE served by the base station. Thus, through the wireless communication interface including the antenna structure, the base station could be configured to provide a coverage area on at least one TDD carrier and on at least one FDD carrier.

The backhaul communication interface 38 could then include a wireless and/or wireless network communication module configured to support communication on a core access network such as that shown in FIG. 1 for instance.

And the controller 40 could then be configured to carry out various base station operations described herein. For instance, the controller could comprise a processing unit 50 including one or more processors (e.g., general purpose microprocessors and/or dedicated processing units), non-transitory data storage 52 (e.g., one or more volatile and/or non-volatile storage components, such as magnetic, optical or flash storage), and program instructions 54 stored in the non-transitory data storage and executable by the processing unit to cause the base station to carry out the operations.

In line with the discussion above, for example, the controller could be configured to detect that the base station is serving a UE in a connected mode on just one or more of the at least one TDD carrier and that the UE supports TDD-FDD carrier aggregation, and the controller could be configured to respond to at least the detecting by reconfiguring the UE from (i) being configured to prioritize connecting on TDD over connecting on FDD to (ii) being configured to prioritize connecting on FDD over connecting on TDD. For instance, the controller could be configured to cause the base station to carry out these and other operations.

Various features described above can be implemented in this context as well, and vice versa.

Figure 4:
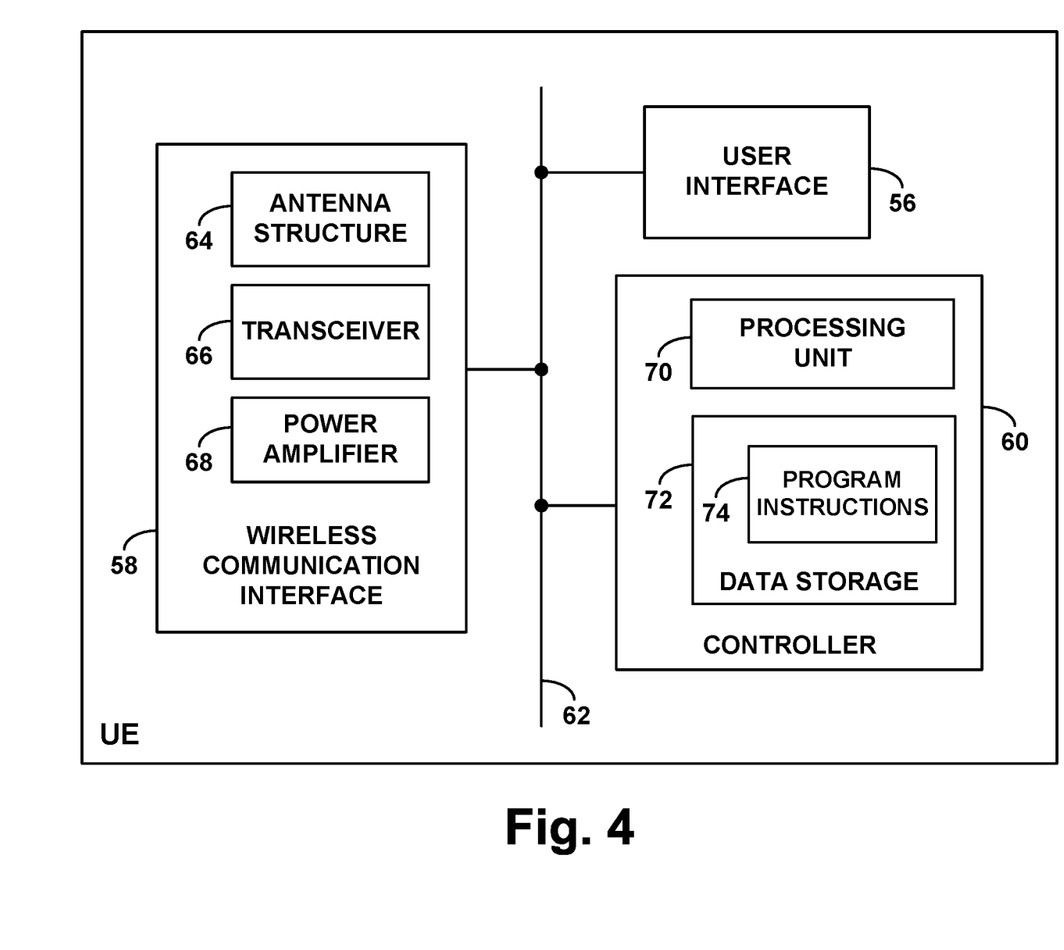
FIG. 4 is a simplified block diagram of an example UE operable in accordance with this disclosure.

FIG. 4 is next a simplified block diagram of an example UE operable in line with the discussion above. A shown, the example UE includes a user interface 56, a wireless communication interface 58, and a controller 60, all of which may be communicatively linked together by a system bus, network, or other connection mechanism 62 and/or could be integrated together or distributed in various ways.

In this example arrangement, the user interface 56 (which might be omitted if the UE is not user operated, such as if the UE is not user operated) could include input and output components that facilitate user interaction with the UE. The wireless communication interface 58 could then include an antenna structure 64, a transceiver 66, and a power amplifier 68, among one or more other RF components, through which the UE is configured to engage in air interface communication.

And the controller 60 could comprise control logic to cause the UE to carry out particular UE operations described herein. For instance, the controller 60 could include a processing unit 70 including one or more processors (e.g., general purpose microprocessors and/or dedicated processing units), non-transitory data storage 72 (e.g., one or more volatile and/or non-volatile storage components, such as magnetic, optical, or flash storage), and program instructions 74 stored in the non-transitory data storage and executable by the processing unit 78 to cause the UE to carry out the operations.

In line with the discussion above, for instance, the controller could be configured to apply a default prioritization according to which the UE prioritizes connecting on TDD over connecting on FDD.

Further, the controller could be configured to receive from a base station, when the UE is being served by the base station on just one or more TDD carriers but the UE is also within coverage of the base station on one or more FDD carriers, a directive for the UE to change from (i) applying the default prioritization to (ii) applying a re-prioritization according to which the UE instead prioritizes connecting on FDD over connecting on TDD, the message being provided by the base station in response at least to the base station determining that the base station is serving the UE on just the one or more TDD carriers and that the UE supports TDD-FDD carrier aggregation. For instance, the controller could be configured to receive the directive from the base station in a connection-release message provided by the base station for release of a connection between the base station and the UE on the one or more TDD carriers.

And the controller could be configured to respond to at least the directive by changing the UE from (i) applying the default prioritization to (ii) applying a re-prioritization according to which the UE instead prioritizes connecting on FDD over connecting on TDD.

Further, as discussed above, the controller configured to respond to at least the directive by applying the re-prioritization for a defined time period and to then automatically revert to applying the default prioritization. And the controller could be configured to respond to at least the directive by applying the re-prioritization for so long as the UE is within coverage of the base station, such as within coverage of the base station on both one or more of the at least one TDD carrier and one or more of the at least one FDD carrier.

Still further, as discussed above, the act of responding to at least the directive by changing the UE from (i) applying the default prioritization to (ii) applying a re-prioritization according to which the UE instead prioritizes connecting on FDD over connecting on TDD could involve so changing the UE in response to (a) the directive and (b) a determination that communication in which the UE will engage is a particular type, such as based on a type of application invoked on the UE.

Yet further, according to the default prioritization, the UE could prioritize connecting on one or more first bands over connecting on one or more second bands, and according to the re-prioritization, the UE could prioritize connecting on the one or more second bands over connecting on the first bands.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. A method for configuring a user equipment device (UE) for operation in a wireless communication system including a base station, wherein the base station provides a coverage area on at least one time-division-duplex (TDD) carrier and on at least one frequency-division-duplex (FDD) carrier, and wherein the UE is configured to prioritize connecting on TDD over connecting on FDD, the method comprising:
    detecting by the base station that the base station is serving the UE in a connected mode on just one or more of the at least one TDD carrier and that the UE supports TDD-FDD carrier aggregation; and
    responsive to at least the detecting, reconfiguring the UE from (i) being configured to prioritize connecting on TDD over connecting on FDD to (ii) being configured to prioritize connecting on FDD over connecting on TDD.

2. The method of claim 1, reconfiguring the UE from (i) being configured to prioritize connecting on TDD over connecting on FDD to (ii) being configured to prioritize connecting on FDD over connecting on TDD comprises reconfiguring the UE from (i) being configured to prioritize connecting on one or more first bands over connecting on one or more second bands to (ii) being configured to prioritize connecting on the one or more second bands over connecting on the one or more first bands.

3. The method of claim 1, wherein detecting by the base station that the base station is serving the UE on just the one or more TDD carriers is based on reference to a UE-context record maintained by the base station.

4. The method of claim 1, wherein detecting by the base station that the UE supports TDD-FDD carrier aggregation is based on reference to capability data of the UE.

5. The method of claim 4, wherein detecting by the base station that the UE supports TDD-FDD carrier aggregation is additionally based on the base station having received from the UE a measurement report indicating that the UE is also within coverage one or more of the at least one FDD carrier.

6. The method of claim 1, wherein the reconfiguring of the UE occurs during disconnection of the UE from the base station on the one or more TDD carriers.

7. The method of claim 6, wherein the reconfiguring of the UE involves the base station including in a connection-release message to the UE an indication interpretable by the UE to cause the UE to change from (i) being configured to prioritize connecting on TDD over connecting on FDD to (ii) being configured to prioritize connecting on FDD over connecting on TDD.

8. The method of claim 1, wherein the UE has a scan-list that causes the UE to scan for TDD coverage before scanning for FDD coverage, and wherein the reconfiguring of the UE comprises the base station providing the UE with a revised scan-list that causes the UE to instead scan for FDD coverage before scanning for TDD coverage.

9. A base station comprising:
    a wireless communication interface including an antenna structure through which the base station is configured to engage in air interface communication, wherein the base station is configured to provide a coverage area on at least one time-division-duplex (TDD) carrier and on at least one frequency-division-duplex (FDD) carrier; and
    a controller,
    wherein the controller is configured to detect that the base station is serving a user equipment device (UE) in a connected mode on just one or more of the at least one TDD carrier and that the UE supports TDD-FDD carrier aggregation, and
    wherein the controller is further configured to respond to at least the detecting by reconfiguring the UE from (i) being configured to prioritize connecting on TDD over connecting on FDD to (ii) being configured to prioritize connecting on FDD over connecting on TDD.

10. The base station of claim 9, wherein the controller comprises a processing unit, non-transitory data storage, and program instructions stored in the non-transitory data storage and executable by the processing unit to cause the base station to carry out at least the detecting and the reconfiguring.

11. The base station of claim 9, wherein reconfiguring the UE from (i) being configured to prioritize connecting on TDD over connecting on FDD to (ii) being configured to prioritize connecting on FDD over connecting on TDD comprises reconfiguring the UE from (i) being configured to prioritize connecting on one or more first bands over connecting on one or more second bands to (ii) being configured to prioritize connecting on the one or more second bands over connecting on the one or more first bands.

12. The base station of claim 9, wherein the base station is configured to carry out the reconfiguring of the UE during disconnection of the UE from the base station on the one or more TDD carriers.

13. A user equipment device (UE) operable in a wireless communication system, the UE comprising:
- a wireless communication interface including an antenna structure through which the UE is configured to engage in air interface communication; and
- a controller,
- wherein the controller is configured to apply a default prioritization according to which the UE prioritizes connecting on time-division-duplex (TDD) over connecting on frequency-division-duplex (FDD),
- wherein the controller is configured to receive from a base station, when the UE is being served by the base station on just one or more TDD carriers but the UE is also within coverage of the base station on one or more FDD carriers, a directive for the UE to change from (i) applying the default prioritization to (ii) applying a re-prioritization according to which the UE instead prioritizes connecting on FDD over connecting on TDD, wherein the message is provided by the base station in response at least to the base station determining that the base station is serving the UE on just the one or more TDD carriers and that the UE supports TDD-FDD carrier aggregation, and
- wherein the controller is configured to respond to at least the directive by changing the UE from (i) applying the default prioritization to (ii) applying a re-prioritization according to which the UE instead prioritizes connecting on FDD over connecting on TDD.

14. The UE of claim 13, wherein the controller is configured to receive the directive from the base station in a connection-release message provided by the base station for release of a connection between the base station and the UE on the one or more TDD carriers.

15. The UE of claim 13, wherein the controller is configured to respond to at least the directive by applying the re-prioritization for a defined time period and to then automatically revert to applying the default prioritization.

16. The UE of claim 13, wherein the controller is configured to respond to at least the directive by applying the re-prioritization for so long as the UE is within coverage of the base station.

17. The UE of claim 13, wherein the controller is configured to respond to the directive by applying the re-prioritization for so long as the UE is within coverage of the base station on both one or more of the at least one TDD carrier and one or more of the at least one FDD carrier.

18. The UE of claim 13, wherein responding to at least the directive by changing the UE from (i) applying the default prioritization to (ii) applying a re-prioritization according to which the UE instead prioritizes connecting on FDD over connecting on TDD comprises so changing the UE in response to (a) the directive and (b) a determination that communication in which the UE will engage is a particular type.

19. The UE of claim 18, wherein the determination that the communication in which the UE will engage in is a particular type is based on an application invoked on the UE.

20. The UE of claim 13, wherein according to the default prioritization, the controller prioritizes connecting on one or more first bands over connecting on one or more second bands, and according to the re-prioritization, the UE prioritizes connecting on the one or more second bands over connecting on the first bands.

\* \* \* \* \*